United States Patent
Bucknor et al.

(10) Patent No.: US 8,087,483 B2
(45) Date of Patent: Jan. 3, 2012

(54) HYBRID POWERTRAIN WITH TORQUE-MULTIPLYING ENGINE STARTING MECHANISM AND METHOD OF CONTROLLING A HYBRID POWERTRAIN

(75) Inventors: Norman K. Bucknor, Troy, MI (US); Anthony L. Smith, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 401 days.

(21) Appl. No.: 12/471,640

(22) Filed: May 26, 2009

(65) Prior Publication Data

US 2010/0304924 A1    Dec. 2, 2010

(51) Int. Cl.
*B60K 6/46* (2007.10)

(52) U.S. Cl. .............. 180/65.245; 903/909; 477/5

(58) Field of Classification Search .......... 180/65.6, 180/65.7, 65.275, 65.21, 65.28, 65.245, 54.1; 903/906, 909, 911, 912, 946; 477/3, 5, 6, 477/167, 174, 181, 107; 123/179.1, 179.3
See application file for complete search history.

(56) References Cited

U.S. PATENT DOCUMENTS

| | | | | |
|---|---|---|---|---|
| 3,421,596 A * | 1/1969 | Livezey et al. | ............... | 180/243 |
| 5,549,524 A * | 8/1996 | Yang | ................. | 477/3 |
| 5,644,200 A * | 7/1997 | Yang | ................. | 318/139 |
| 6,638,193 B2 * | 10/2003 | Hamai | ................ | 475/5 |
| 6,805,647 B2 * | 10/2004 | Silveri et al. | .............. | 475/4 |
| 6,887,180 B2 * | 5/2005 | Pels et al. | .............. | 477/3 |
| 7,240,751 B2 * | 7/2007 | Hoare et al. | ............... | 180/65.25 |
| 7,597,648 B2 * | 10/2009 | Conlon et al. | ............... | 477/4 |
| 7,753,822 B2 * | 7/2010 | Weinschenker et al. | .......... | 477/3 |
| 7,980,980 B2 * | 7/2011 | Rask et al. | .............. | 475/5 |
| 7,992,661 B2 * | 8/2011 | Nomura et al. | ............ | 180/65.21 |
| 7,998,023 B2 * | 8/2011 | Holmes et al. | ................ | 477/5 |
| 2002/0086755 A1 * | 7/2002 | Hamai | .............. | 475/5 |
| 2005/0064974 A1 * | 3/2005 | Bezian et al. | ................. | 475/5 |
| 2005/0090370 A1 * | 4/2005 | Berger et al. | ................. | 477/167 |
| 2007/0173371 A1 * | 7/2007 | Hayashi et al. | ................. | 477/3 |
| 2008/0058154 A1 * | 3/2008 | Ashizawa et al. | ................ | 477/5 |
| 2008/0125264 A1 * | 5/2008 | Conlon et al. | ................. | 475/5 |
| 2008/0153660 A1 * | 6/2008 | Uejima et al. | ................. | 477/3 |
| 2008/0154455 A1 * | 6/2008 | Hidaka et al. | ................. | 701/22 |
| 2009/0227409 A1 * | 9/2009 | Ito et al. | ................. | 475/5 |
| 2009/0314560 A1 * | 12/2009 | Oba et al. | ................. | 180/65.22 |
| 2010/0075798 A1 * | 3/2010 | Suzuki et al. | ................. | 477/5 |
| 2010/0087290 A1 * | 4/2010 | Schoenek et al. | ................. | 477/5 |
| 2010/0113213 A1 * | 5/2010 | Oba et al. | ............. | 477/5 |
| 2010/0193268 A1 * | 8/2010 | McGee | ................. | 180/65.21 |
| 2011/0237378 A1 * | 9/2011 | Rask et al. | ................. | 475/5 |

* cited by examiner

*Primary Examiner* — J. Allen Shriver, II
*Assistant Examiner* — Brodie Follman
(74) *Attorney, Agent, or Firm* — Quinn Law Group, PLLC

(57) ABSTRACT

A hybrid powertrain is provided that provides engine starting from an electric-only mode with a reduced torque load on the motor/generator. The powertrain includes an engine and a motor/generator, which may be a single motor/generator in a strong or full hybrid, but is not limited to such. The motor provides propulsion torque in an electric-only operating mode, and is configured to apply torque to a transmission input member. A first clutch is selectively engagable to connect the engine output member for common rotation with the transmission input member. An engine starting mechanism is provided that multiplies motor torque used to start the engine so that less is diverted from propelling the vehicle, enabling a smaller motor/generator to be used. A method of controlling such a powertrain is also provided.

11 Claims, 2 Drawing Sheets

HYBRID POWERTRAIN WITH TORQUE-MULTIPLYING ENGINE STARTING MECHANISM AND METHOD OF CONTROLLING A HYBRID POWERTRAIN

TECHNICAL FIELD

The invention relates to a hybrid powertrain with a mechanism for starting an engine and a method of controlling a hybrid powertrain.

BACKGROUND OF THE INVENTION

Hybrid powertrains have two or more power sources. Some hybrid vehicles are operable in an electric-only operating mode in which drive power is provided exclusively by one or more electric motor/generators that utilize power stored in an energy storage device (ESD) such as a battery. For hybrid vehicles that have an internal combustion engine as the other power source, operation in an electric-only mode improves fuel economy and reduces emissions. When the ESD is discharged to a predetermined level or when additional output torque is required, the engine is started. Starting the engine is typically accomplished using a dedicated starter motor or by engaging a clutch that directly connects the engine and the motor/generator, referred to as a starting clutch. Dedicated starter motors add weight and cost.

SUMMARY OF THE INVENTION

A hybrid powertrain is provided that provides engine starting from an electric-only mode with a reduced torque load on the motor/generator. The powertrain includes an engine and a motor/generator, which may be a single motor/generator in a strong or full hybrid, but is not limited to such. The motor provides propulsion torque in an electric-only operating mode, and is configured to apply torque to a transmission input member. A first clutch is selectively engagable to connect the engine output member for common rotation with the transmission input member. An engine starting mechanism is provided that multiplies motor torque used to start the engine so that less is diverted from propelling the vehicle, enabling a smaller motor/generator to be used. The engine starting mechanism includes a first and a second gear train, as well as a second clutch having a first portion connected with the transmission input member via the first gear train and a second portion connected with the engine output member via the second gear train. The second clutch is selectively engagable to connect the first and second portions for common rotation, thereby transferring torque from the transmission input member to the engine output member with torque multiplication. The second clutch may be a hydraulic clutch of smaller capacity than the first clutch. In some embodiments, the second clutch is an active material clutch, also referred to as a smart clutch, such as a magnetorheological fluid (MRF) clutch or an electrorheological fluid (ERF) clutch. An MRF is a type of smart fluid with magnetic particles suspended in a carrier fluid. When subjected to a magnetic field, the apparent viscosity of the fluid increases, allowing the fluid's ability to transmit force to be controlled. Examples of suitable particles include straight iron powders, reduced iron powders, iron oxide powder/straight iron powder mixtures and iron oxide powder/reduced iron powder mixtures. An ERF is a suspension of nonconducting particles in an electrically insulating fluid. The apparent viscosity of an ERF changes in response to an electric field, allowing the fluid's ability to transmit force to be controlled.

The use of torque multiplying gear trains and the second clutch reduces the reserve torque requirement for the motor to start the engine, which reduces the possibility of torque sag, i.e., the diversion of output torque from the driveline when the motor does not have sufficient torque reserve to start the engine. This allows for a smaller motor/generator than with a starting clutch that directly connects the transmission input member and the engine output member. The engine starting mechanism also reduces control challenges associated with starting the engine directly with a typical engine starting clutch which has a slower response time due to fill time of a hydraulic clutch, as well as nonlinear behavior due to variations in the compressibility of fluid caused by entrained air. Finally, start quality is improved by a reduction in driveline torque disturbance as the speed of the engine output member and the speed of the transmission input member may be synchronized before the first clutch is engaged.

A method controlling the powertrain described above includes engaging the second clutch to transfer torque from the motor/generator to the engine to start the engine during an electric-only operating mode, and may include releasing the second clutch after the engine is started, synchronizing the speed of the engine output member with the speed of the transmission input member, and then engaging the first clutch to thereby transfer engine torque to the transmission input member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
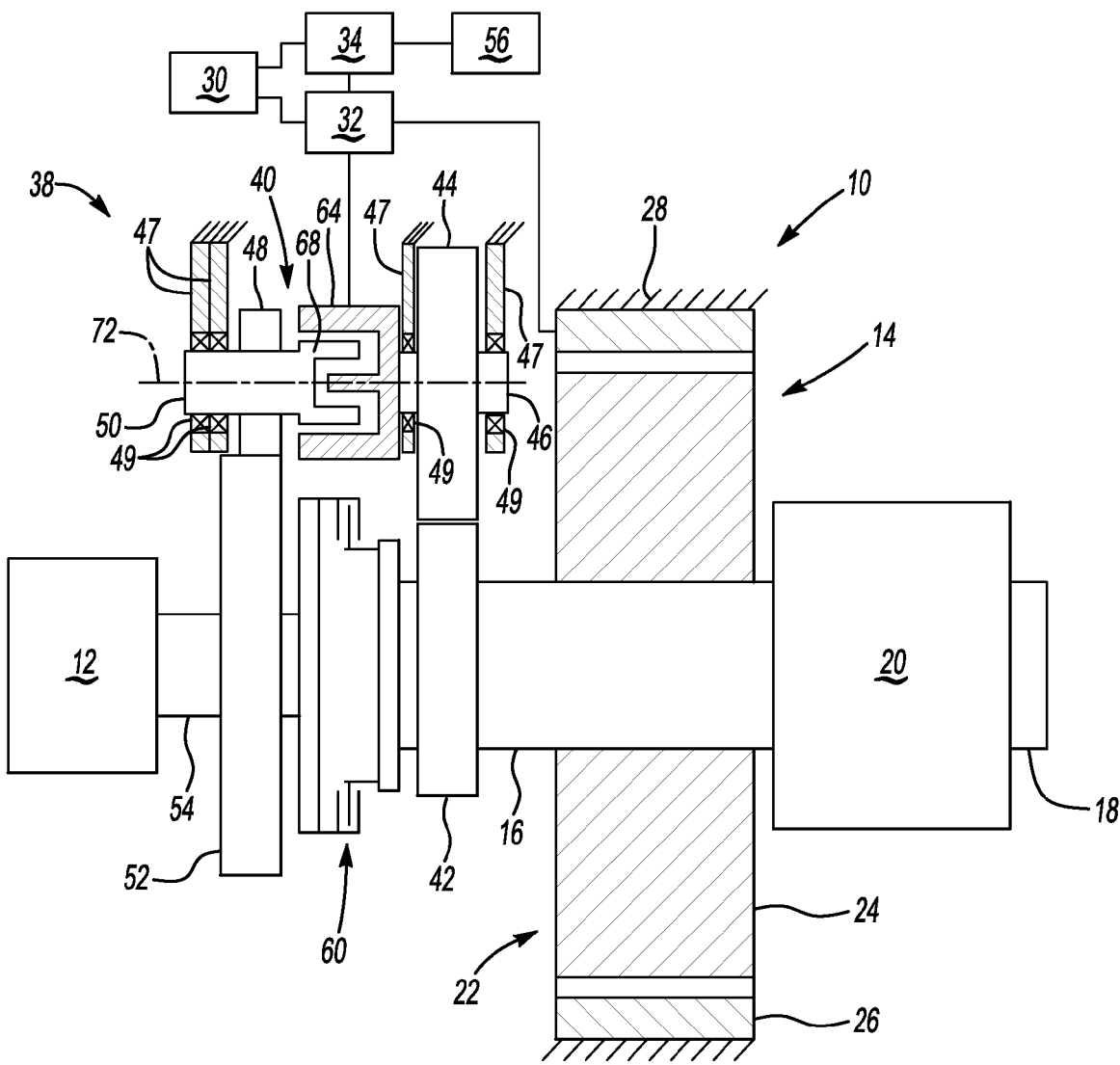
FIG. 1 is a schematic illustration of a hybrid powertrain with an engine start mechanism.

Referring to the drawings, wherein like reference numbers refer to like components throughout the several views, FIG. 1 shows a hybrid powertrain 10 having an engine 12 and a hybrid transmission 14. The transmission 14 has a transmission input member 16 and a transmission output member 18. A transmission gearing arrangement 20 transfers torque from the input member 16 to the output member 18. The transmission gearing arrangement 20 includes a plurality of selectively engagable clutches and brakes, as well as gears that may be planetary gear sets or intermeshing gear trains. The clutches and brakes are engagable in different combinations to affect torque transfer at different torque ratios such as overdrive and underdrive ratios, as is known.

A single motor/generator 22 has a rotor 24 mounted for rotation with the input member 16 and a stator 26 grounded to a stationary (i.e., nonrotatable) member 28, such as a transmission casing. An energy storage device (ESD) 30 holds stored electrical energy that is selectively applied to the stator 26 through a power inverter 32 under the direction of an electronic controller 34. The ESD 30 and motor/generator 22 are sufficiently sized so that the powertrain 10 may provide sufficient propulsion torque to the output member 18 using only the motor/generator 22, and not the engine 12, as a power source under many operating conditions, establishing what is referred to as an electric-only operating mode.

The controller 34 receives a variety of input signals indicative of operating conditions via sensors such as a throttle position sensor, wheel speed sensors, etc. Under certain operating conditions, these input signals are equivalent to an engine start request. The controller 34 then operates an engine starting mechanism 38 in order to start the engine 12 and deliver engine torque to the input member 16 without creating appreciable torque sag by motor torque diverted to start the engine 12. The engine starting mechanism 38 includes an engine starting clutch 40 and a first gear train having a first gear 42 connected for rotation with the transmission input member 16 (i.e., a first shaft) and meshing with a second gear 44 mounted for rotation on a second shaft 46. Shaft 46 is rotatably supported by the transmission casing 28 by support portions 47 of the casing 28 extending from the casing 28 to the shaft 46 on either side of the second gear 44, with bearings 49 between the support portions 47 and gear 44. A second gear train includes a third gear 48 and a fourth gear 52. The third gear 48 is a spur gear mounted on a third shaft 50 that is rotatably supported by the casing 28 by support portion 47 with bearings 49 between the support portion 47 and the third gear 48. The fourth gear 52 is rotatably supported by an engine output member 54, such as a crankshaft that may be turned to start the engine 12. The fourth gear 52 may be a ring gear or flex plate of the engine 12.

A first portion 64 and a second portion 68 of the engine starting clutch 40 are selectively engagable to transmit torque from the shaft 46 to the shaft 50, thus creating a powerflow path from the motor/generator 22 to the engine 12 through the gears 42, 44, 48, 52, which are configured to multiply torque from the transmission input member 16 to the engine output member 54. The portions 64, 68 may be friction plates and reaction plates (in the case of a hydraulic clutch), a drum and rotor (in the case of an MRF clutch), or other engagable portions of known clutch types. Specifically, when operating conditions warrant, the controller 34 provides an actuating signal to the starting clutch 40. In a preferred embodiment, the gears 42 and 44 are designed to have a gear ratio (ratio of speed of gear 44 to gear 42) of approximately 1:1 and the gears 48 and 52 are designed to have a gear ratio (the ratio of speed of gear 52 to speed of gear 48) of approximately 2.5:1. That is, motor torque provided through the first gear train 42, 44 is multiplied by 2.5 through the second gear train. Thus, the engine output member 54 spins at a lower speed than the rotor 24 of motor/generator 22 to start the engine 12. Once the engine 12 is started, the fired engine speed is controlled by controller 34, or by another controller in communication with controller 34, to bring the speed of the engine output member 54 within a predetermined range or, or equal to, the speed of the input member 16. Once a controlled speed is reached, the controller 34 signals a valve body 56 to direct hydraulic pressure to a main clutch 60 to fill an apply cavity that engages opposing clutch plates of the clutch 60, transferring torque from the engine 12 to the transmission 14. The starting clutch 40 is disengaged when the engine 12 is started prior to engaging the main clutch 60. Prior to start of the engine 12 and engagement of starting clutch 40, clutch slip in the clutch 40 is equal in magnitude to the speed of the gear 44. Once the engine 12 is started and before main clutch 60 is engaged, starting clutch 40 is disengaged. When main clutch 60 is engaged, the slip in the starting clutch 40 increases in magnitude.

Figure 2:
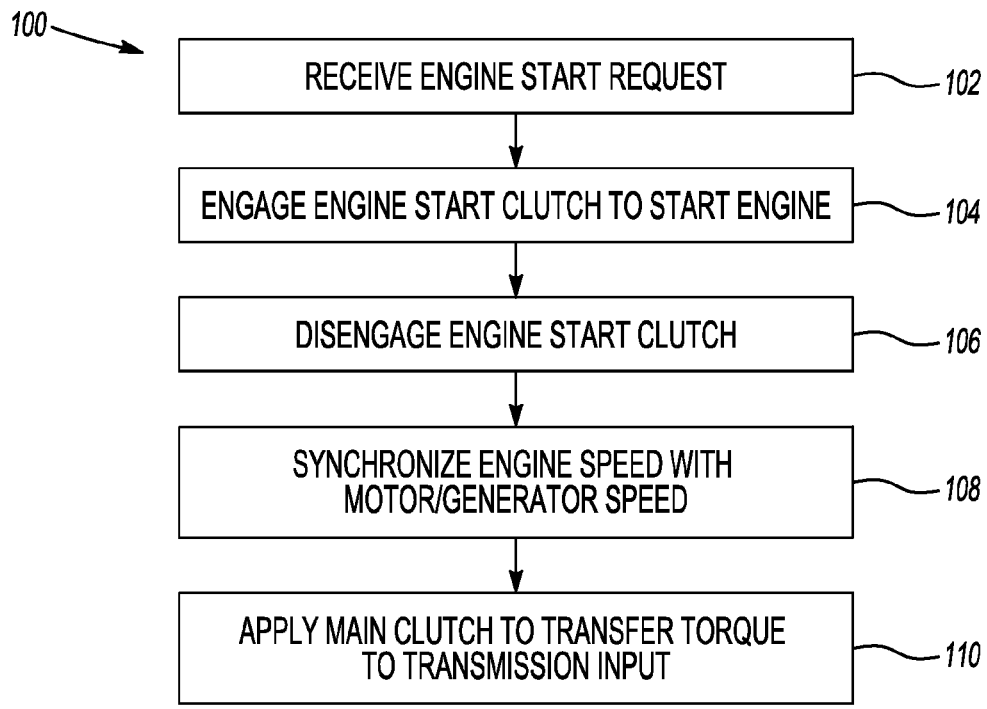
FIG. 2 is a flow chart illustrating a method of controlling the powertrain of FIG. 1.

Referring to FIG. 2, a method 100 of controlling a hybrid powertrain is described with respect to hybrid powertrain 10. First, in block 102, controller 34 receives an engine start request, which is one or more sensor signals indicative of operating conditions warranting starting the engine 12 during an electric-only operating mode. Next, in block 104, the controller 34 causes the starting clutch 40 to be engaged bringing the engine 12 up to firing speed. The mechanism by which the controller 34 engages clutch 40 depends on the type of clutch used.

Once the engine 12 is firing, the clutch 40 is then disengaged by the controller 34 in block 106. In block 108, engine speed is then synchronized with the speed of the motor/generator 22 using speed sensors (not shown) or otherwise, and an engine control module (not shown). The main clutch 60 is then applied in block 110, completing the transition from an electric-only operating mode to a hybrid operating mode.

The clutch 40 may be a hydraulic clutch, or an active material clutch, sometimes referred to as a "smart clutch". The clutch capacity of clutch 40 is lower than the clutch capacity of main clutch 60 because it need not handle the greater torque load of the engine output member 54. Thus, even if the clutch 40 is a hydraulic clutch, it will be filled faster, at a lower fill volume, than the main clutch 60. Alternatively, the clutch 40 may be a smart clutch, such as an MRF or ERF clutch. A smart clutch has the advantage of precise engagement and disengagement times, as the clutch connection is controllable by applying an electric or magnetic field, rather than dependent on hydraulic fluid building to a sufficient pressure.

Exemplary Embodiment of an Engine Starting Clutch

Figure 3:
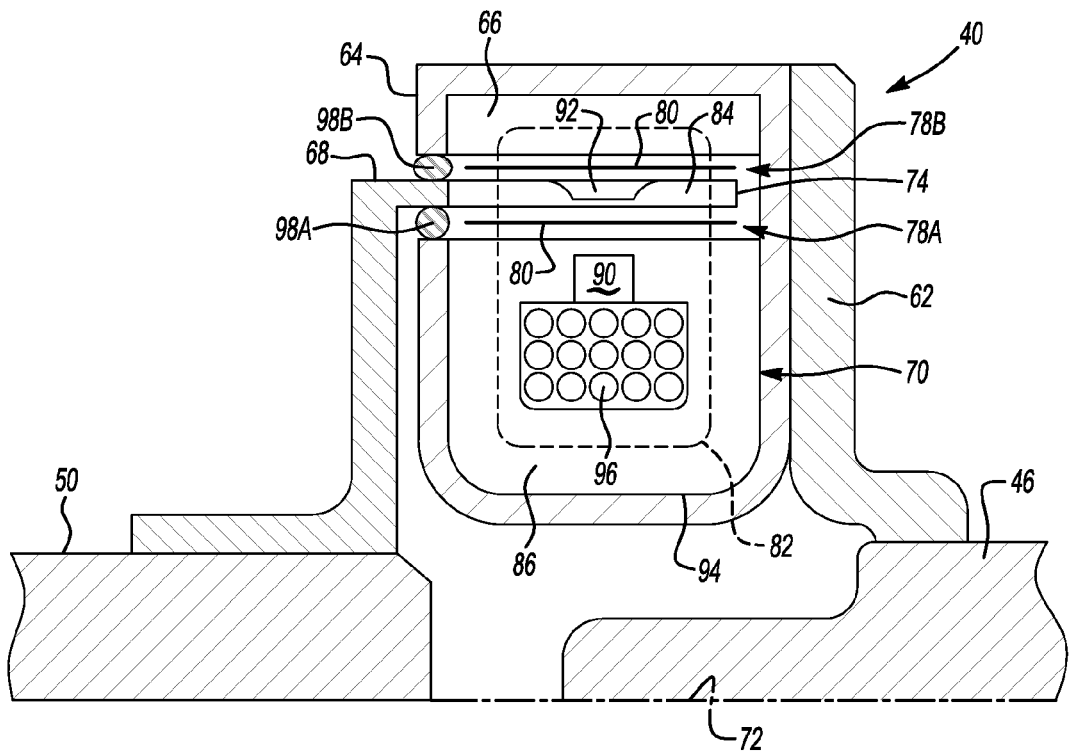
FIG. 3 is a schematic partial cross-sectional side view of an exemplary MRF clutch for the engine start mechanism of FIG. 1.

Referring to FIG. 3, an exemplary MRF clutch 40 selectively joins or couples a pair of rotatable members, exemplified herein as the respective input and output members (i.e., shaft 46 and shaft 50, respectively). A connecting member or sleeve 62 can be directly connected to or interposed between the input member 46 and the first portion 64 of the MRF clutch 40, referred to as rotatable outer housing or drum 64, to rotate in conjunction therewith. That is, rotation of the shaft 46 in conjunction with an actuated MRF clutch 40 ultimately rotates the drum 64, with the MRF clutch 40 operable for selectively transferring or transmitting torque from the shaft 46 to the shaft 50 as described below.

The MRF clutch 40 includes a magnetically permeable stator 66 within the drum 64, the second portion 68, referred to as rotor 68, and a magnetic field generator 70. The rotor 68, having a rotational degree of freedom with respect to the stator 66, is journaled, splined, or otherwise directly connected to the shaft 50 to rotate in conjunction therewith about a rotational axis 72. The rotor 68 includes an axial member 74 which at least partially defines at least a pair of respective inner and outer working gaps 78A and 78B as discussed in more detail below, with a volume of MR fluid 80 substantially filling the working gaps 78A, 78B. Although not shown in FIG. 3 for clarity, one or more intermediate working gaps may be disposed between the working gaps 78A, 78B.

The magnetic field generator 70 is in field communication with the MR fluid 80 in each of the working gaps 78A, 78B, with the magnetic field illustrated generally in FIG. 3 by a set of magnetic flux lines 82. The stator 66 and the rotor 68 each include respective magnetic or magnetically-permeable portions 84, 86 and non-magnetic portions 90, 92, which serve to guide the magnetic field or flux lines 82 in a manner suitable for the purposes disclosed herein. Suitable magnetizable materials for use as the magnetic portions 84, 86 and stator 66 can include, but are not limited to, iron, steel, carbonyl iron, etc., or a combination comprising at least one of the exemplary magnetizable materials described above. Suitable non-magnetic materials for use as the non-magnetic materials 90, 92 can include, but are not limited to, stainless steel, aluminum, brass, plastics, etc., or a combination thereof Alternatively, an air gap may be employed in place of or in addition to the use of non-magnetic portions, as will be understood by those of ordinary skill in the art.

The magnetic field generator 70 can be configured as an electromagnet as shown in FIG. 3, including a magnetic core 94 and a field coil 96 that is electrically energized via the ESD 30 of FIG. 1. Exemplary fluid seals 98A, 98B serve to prevent leakage of the MR fluid 80 from the working gaps 78A, 78B. While exemplary fluid seals 98A, 98B are depicted in FIG. 3, it will be appreciated that other arrangements or sealing devices may also be employed.

An exemplary composition for the MR fluid 80 includes magnetizable particles, a carrier fluid, and additives. By way of example, the magnetizable particles of the MR fluid 80 can include paramagnetic, super-paramagnetic, or ferromagnetic compounds or a combination thereof. The magnetizable particles can be comprised of materials such as but not limited to iron, iron oxide, iron nitride, iron carbide, carbonyl iron, chromium dioxide, low carbon steel, silicon steel, nickel, cobalt, or the like, or a combination thereof. The term "iron oxide" can include all forms of pure iron oxide, such as, for example, $Fe_2O_3$ and $Fe_3O_4$, as well as those containing small amounts of other elements such as manganese, zinc, barium, etc. Specific examples of iron oxide include ferrites and magnetites. In addition, the magnetizable particles can be comprised of alloys of iron, such as, for example, those containing aluminum, silicon, cobalt, nickel, vanadium, molybdenum, chromium, tungsten, manganese, copper, or a combination thereof.

When energized via the ESD 30 or other suitable energy storage device, the magnetic field generator 70 creates a magnetic field (flux lines 82), which ultimately passes through the MR fluid 80 filling the working gaps 78A, 78B. That is, a magnetic field is electrically induced around the wires of the field coil 96, radiating outward therefrom to produce the resultant magnetic field (flux lines 82). As will be understood by those of ordinary skill in the art, the magnetic field naturally weakens in a direction progressing radially-outward away from the wires of the field coil 96, with the magnetic field strengthening in closer proximity to the field coil 96. While shown schematically as a single box in FIG. 3 for clarity, it is understood that the magnetic field lines of an actual magnetic field are concentrically circular with respect to the magnetic field generator 70, and the direction of circulation of the magnetic field itself is dependent upon the direction of current flow within the field coil 96. These factors are at least partially controllable via the controller 34 of FIG. 1 and the ESD 30.

When the field coil 96 is electrically energized, the magnetic particles suspended in the carrier of the MR fluid 80 will align with the induced magnetic field (flux lines 82), thereby increasing the apparent viscosity of the MR fluid 80. The increase in apparent viscosity increases the shear strength of the MR fluid 80, resulting in torque transfer from the input member 46 to the output member 50 through the MRF clutch 40. The output member 50 can then be used directly or indirectly for any suitable purpose, such as to start the engine 12 of FIG. 1. Because energizing and responsiveness of fluid 80 thereto is nearly instantaneous, engine starting is carried out quickly and efficiently with the engine starting mechanism 40.

While the best modes for carrying out the invention have been described in detail, those familiar with the art to which this invention relates will recognize various alternative designs and embodiments for practicing the invention within the scope of the appended claims.

The invention claimed is:

1. A hybrid powertrain comprising:
   an engine with an engine output member;
   a transmission with a transmission input member;
   a motor/generator configured to apply torque to the transmission input member;
   a first clutch selectively engagable to connect the engine output member for common rotation with the transmission input member; and
   an engine starting mechanism including:
      a first and a second gear train; and
      a second clutch having a first portion connected with the transmission input member via the first gear train and a second portion connected with the engine output member via the second gear train, and selectively engagable to transfer torque from the transmission input member to the engine output member with torque multiplication.

2. The powertrain of claim 1, wherein the first gear train includes a first gear connected for rotation with the transmission input member and a second gear meshing with the first gear and connected for rotation with the first portion of the second clutch.

3. The powertrain of claim 1, wherein the second gear train includes a third gear connected for rotation with the second portion of the second clutch and a fourth gear meshing with the third gear and connected for rotation with the engine output member; and wherein the fourth gear is larger than the third gear to cause the torque multiplication.

4. The powertrain of claim 1, wherein the second clutch is an active material clutch.

5. The powertrain of claim 4, wherein the second clutch is a magnetorheological clutch.

6. The powertrain of claim 1, wherein the first clutch is a hydraulic clutch.

7. The powertrain of claim 1, wherein the powertrain is operable in an electric-only operating mode, and wherein the first clutch is engagable during the electric only operating mode to establish a hybrid operating mode.

8. A method of controlling a hybrid powertrain having an engine with an engine output member, a transmission with a transmission input member, a motor/generator configured to apply torque to the transmission input member, and a first clutch selectively engagable to connect the engine output member for common rotation with the transmission input member; the method comprising:
   engaging a second clutch to transfer torque from the motor/generator to the engine to start the engine during an electric-only operating mode; wherein the second clutch connects the motor/generator to the engine via gear trains configured to multiply motor torque.

9. The method of claim 8, further comprising:
   releasing the second clutch after the engine is started.

10. The method of claim 8, further comprising:
   synchronizing speed of the engine output member with speed of the transmission input member; and
   engaging the first clutch after the synchronizing to thereby transfer engine torque to the transmission input member.

11. The method of claim 8, wherein engaging the second clutch includes applying an electric or magnetic field to the second clutch.

* * * * *